UNITED STATES PATENT OFFICE.

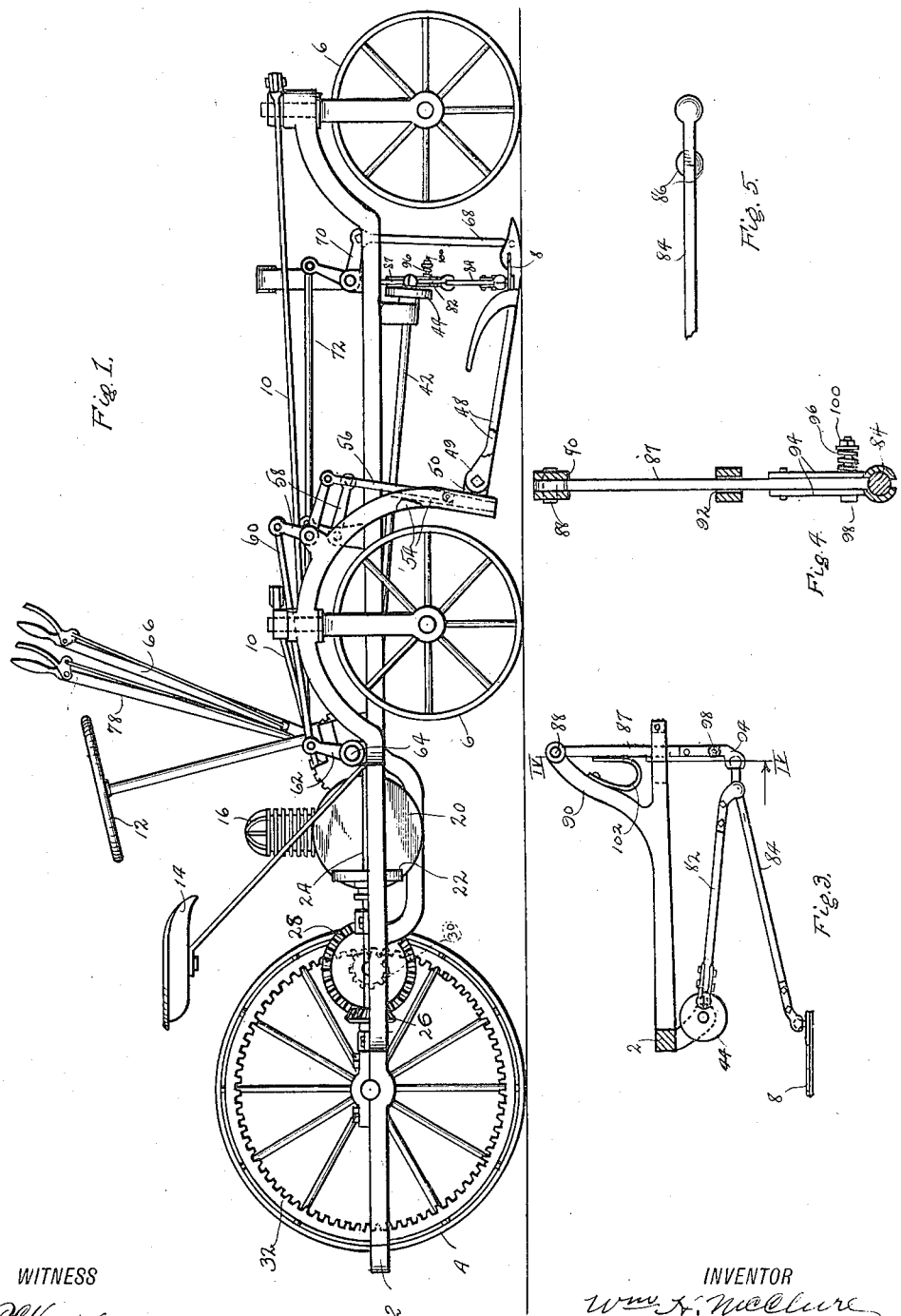

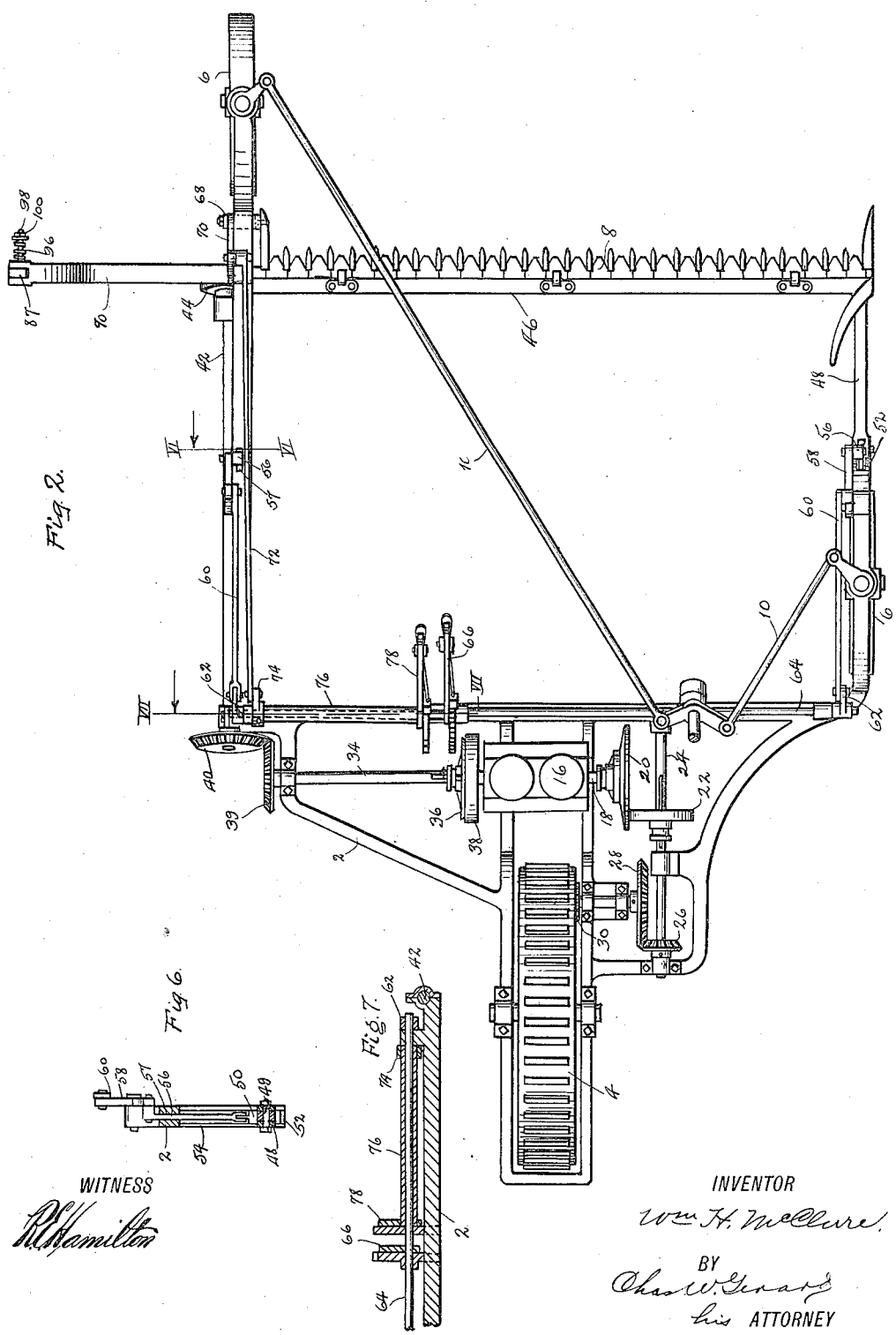

WILLIAM H. McCLURE, OF REPUBLIC, KANSAS.

MOWING-MACHINE.

1,294,133.    Specification of Letters Patent.    Patented Feb. 11, 1919.

Application filed February 21, 1916. Serial No. 79,570.

*To all whom it may concern:*

Be it known that I, WILLIAM H. McCLURE, a citizen of the United States, residing at Republic, in the county of Republic and State of Kansas, have invented certain new and useful Improvements in Mowing-Machines, of which the following is a full and exact specification.

The present invention has relation to mowing machines, and aims to devise a construction providing an improved manner of supporting and adjusting the cutter or sickle bar frame. It is also an object to provide an improved arrangement and construction for driving the mowing mechanism in an effective manner while permitting all desired adjustments of the cutter bar frame. A further object is the provision of safety means whereby any unusual obstruction to the mowing mechanism will result in rendering the drive connections inoperative.

With these general objects in view, as well as other minor objects as will hereinafter appear, the invention will now be described with reference to one form of embodiment thereof as illustrated in the accompanying drawings, forming a part of this specification, after which those various features and combinations deemed to be novel will be severally set forth and defined in the appended claims.

In the drawings—

Figure 1 is a side elevation of a machine embodying the present improvements (certain of the frame portions being shown partially broken away);

Fig. 2 is a plan view of the same (also having certain parts broken away);

Fig. 3 is a detail, on a larger scale, showing a portion of the drive connections to the mowing mechanism;

Fig. 4 is a section, on a still larger scale, taken on the line IV—IV of Fig. 3;

Fig. 5 is a detail plan of an end portion of one of the pitman connections; and

Figs. 6 and 7 are sections taken on the lines VI—VI and VII—VII, respectively, of Fig. 2.

Referring to the said drawings in detail, the machine is illustrated as comprising a main machine frame 2 provided with a rear centrally mounted tractor wheel 4 and with the two side steering or guiding wheels 6, 6, one in advance of the other and so arranged that the right wheel (looking from the driver's position) is located directly to the rear of the right end of the cutter or sickle bar 8, while the left wheel is located directly in front of the left end of said sickle bar. The frame 2 is so constructed as to arch over the side wheels 6 and the latter are provided with reach rods 10, 10, and connections of the usual or any preferred form for manipulation from the hand steering wheel 12 adjacent the driver's seat 14.

Upon the frame 2 is carried the internal combustion engine 16, one end of the crank shaft 18 of which carries the friction disk 20 in engagement with an adjustable friction wheel 22 on the countershaft 24. This change-speed drive connects with the traction wheel 4 through the bevel gearing 26, 28, and the spur gear 30 meshing with the internal gear ring 32 carried by said wheel 4.

The engine is also arranged to drive a shaft 34 carrying the clutch member 36 adapted to be clutched with the fly wheel 38, said shaft being connected by bevel gears 39, 40, with a shaft 42 journaled in the frame 2 and provided with a crank disk 44 at its front end directly overlying the head of the cutter or sickle bar 8. This sickle bar is of the usual reciprocating type and is carried by an auxiliary frame 46, the side arms 48 of which extend rearwardly and are pivotally and detachably connected at 49 for vertically swinging movement to slide blocks 50 carried in guideways 52 (see Figs. 1 and 6) provided in downward extensions 54 from the main frame 2 at points slightly in advance of the position of the right guiding wheel 6. Links 56 connect these blocks 50 to bell crank levers 58 mounted on the sides of frame 2, the left link 56 passing through a guide slot 57 in said frame 2 (see Fig. 2); and these levers 58 are in turn connected by links 60 to cranks 62 on the opposite ends of a shaft 64 mounted on the frame 2 and provided with a lever 66 whereby the blocks 50 may be readily adjusted simultaneously to different vertical positions. In view of the curved contour of the ground-rest portion of the sickle bar frame (see Fig. 1) it is obvious that such adjustment of the vertical elevation of the rear ends of the frame by means of said blocks 50 will result in rocking said frame and bringing the sickle into varying cutting elevations. For elevating the front portion of said auxiliary or sickle frame or lifting it upward into entirely inoperative position the same is swung about the pivots 49 by means of a link 68 detachably connected to a bell crank 70 mounted on frame 2 and provided with link connection 72 to a crank 74 carried by a sleeve 76 journaled on one end portion of the shaft 64 and provided with the manually operable lever 78. It is thus apparent that the sickle bar frame is arranged to be swung about either of two axes extending transversely and parallel to each other upon opposite sides of, at the front and rear, respectively, of the sickle bar.

The operative connections between the crank disk 44 and the cutter or sickle bar 8 comprise the following parts, as illustrated in Fig. 3. The crank or wrist pin of this disk has ball and socket connection with one end of an inclined pitman bar 82, the opposite end of which has similar connection with an oppositely inclined pitman link 84, said link 84 having adjacent its upper end the bosses 86 (Fig. 5) for engagement by the corresponding end of the bar 82. The lower end of this link 84 is likewise joined by ball and socket connection with the head of the sickle bar 8 (see Fig. 3). The upper end portion of the link 84 turns from an incline to the horizontal and is joined by ball and socket union to the lower end of a hanger 87 pivoted at 88 to a side extension 90 from the main frame 2. This hanger extends through a guide slot 92 which permits outwardly pivotal movement of the hanger but retains it within a substantially vertical plane. By this construction the connection between the pitman members is restrained from vertical swinging movement, and the proper reciprocating motion is transmitted to the sickle bar, and in the event of any material obstruction to the mowing operation a break-joint is provided between the link 84 and the hanger 87 comprising the socket-leaves 94 which are held in engagement with the end of the link 84 by the spring 96 on the bolt 98, the tension of which spring may be readily varied by the nut 100. In the event of this joint being broken the hanger 87 is swung out of the path of movement of the end of the pitman link 84 by means of the leaf spring 102 secured to the extension 90.

It will thus be seen that all necessary movements of the sickle bar frame, either bodily or pivotally about either of its axes, are permitted while maintaining an effective sickle drive for all the positions of said frame. For the purpose of accommodating these movements of said sickle bar frame it will also be noted that the longitudinal drive shaft 42 is arranged at a slight forward decline, bringing the center of motion of the crank pin of the disk 44 in approximately the vertical plane of the lower pitman member 84 when the sickle bar frame is in extreme lowered or normal operative position. By this arrangement the crank pin connection is allowed as little motion as possible out of the plane of the sickle's reciprocation, and the angle between the pitman bars 82 and 84 also kept as small as practicable, so that the power is transmitted as directly as possible to the sickle for the different positions thereof and at the same time the wear on the connections is reduced to a minimum.

It will thus be apparent that a simple and efficient construction has been devised for carrying out the various objects of the invention, and while the foregoing represents one practical form of embodiment of the improvements, the right is reserved to such formal changes and modifications as may fairly fall within the scope of the appended claims.

Claims:

1. In a mowing machine, a frame provided with a pair of forward supporting wheels arranged to support the opposite sides of said frame, one of said wheels being located in advance of the other, a sickle bar carried by said frame with one end of said bar located directly to the rear of said advance supporting wheel and the opposite end of said bar located directly in front of the other supporting wheel, and separate supporting connections for supporting the opposite ends of said bar from said opposite sides, respectively, of said frame.

2. In a mowing machine, a main frame provided with a pair of forward supporting wheels for supporting the opposite sides of said frame, one of said wheels being located in advance of the other and provided with means for steering the same to guide the machine, an auxiliary frame carried by said main frame, a sickle bar mounted on said auxiliary frame with one end of said bar located directly to the rear of said advance supporting wheel and the opposite end of said bar located directly in front of the other supporting wheel, and separate supporting connections for supporting the opposite ends of said auxiliary frame from said opposite sides, respectively, of said main frame.

3. A mowing machine comprising a main frame provided with supporting wheels, an auxiliary frame carried by said main frame, and a sickle bar mounted on said auxiliary frame, one of said wheels being located directly to the rear of one end of said sickle bar and another of said wheels being located directly in front of the opposite end of said sickle bar, and said auxiliary frame being mounted for vertical swinging movement about an axis extending transversely intermediate said last named supporting wheels.

4. In a mowing machine, the combination of a main frame and an auxiliary sickle bar frame, a sickle bar mounted on said auxiliary frame, pivotal connections between said main and auxiliary frames at opposite sides, at the front and rear, respectively, of said sickle bar, and means for swinging said auxiliary frame about the axis of either of said pivotal connections, including means for effecting approximately vertical adjustment of the pivotal connections at one side of said bar.

5. In a mowing machine, the combination of a main frame and an auxiliary sickle bar frame, a sickle bar mounted on said auxiliary frame, pivotal connections between said main and auxiliary frames at opposite sides, at the front and rear, respectively, of said bar, said connections at the rear of said bar being mounted for approximately vertical sliding adjustment, and means for vertically swinging said auxiliary frame about the axis of either of said pivotal connections, including means for adjusting said rear pivotal connections.

6. A mowing machine comprising a wheel-supported main frame, an auxiliary frame carried by said main frame, a sickle bar mounted on said auxiliary frame, and means for vertically swinging said auxiliary frame about either of two parallel transverse axes on opposite sides at the front and rear, respectively, of said sickle bar.

7. A mowing machine comprising a main frame provided with supporting wheels, an auxiliary frame carried by said main frame, a sickle bar mounted on said auxiliary frame, one of said wheels being located directly to the rear of one end of said sickle bar and another of said wheels being located directly in front of the opposite end of said sickle bar, and means for swinging said auxiliary frame about either of two axes extending parallel to said sickle bar and on opposite sides at the front and rear thereof, respectively.

8. A mowing machine comprising a wheel-supported main frame, an auxiliary sickle bar frame mounted upon said main frame for vertical swinging movement about a transverse axis, and an engine supported on said main frame and provided with drive connections to said sickle bar, said drive connections including a single longitudinal rotary drive shaft extending between said engine and the vertical plane of said sickle bar, and connections between said shaft and sickle bar constructed and arranged to reciprocate the latter while permitting vertical swinging movement of said auxiliary frame independently of said drive shaft.

9. A mowing machine comprising a wheel-supported main frame, an auxiliary sickle bar frame mounted upon said main frame for vertical swinging movement about a transverse axis, and an engine supported on said main frame and provided with drive connections to said sickle bar including a longitudinal drive shaft having a crank disk overlying the head of said sickle bar and a pair of pitman rods connecting said disk and sickle bar and arranged to reciprocate the latter while permitting swinging movement of said auxiliary frame independently of said drive shaft.

10. A mowing machine comprising a wheel-supported main frame, an auxiliary sickle bar frame mounted upon said main frame for vertical swinging movement about a transverse axis, and an engine supported on said main frame and provided with drive connections to said sickle bar including a longitudinal drive shaft having a crank disk overlying the head of said sickle bar and a pair of pitman rods connected to each other and to said disk and sickle bar, respectively, and means for restraining vertical movement of the connection between said rods and thereby effecting reciprocation of said sickle bar.

11. A mowing machine comprising a wheel-supported main frame, an auxiliary sickle bar frame mounted upon said main frame for vertical swinging movement about a transverse axis, and an engine supported on said main frame and provided with drive connections to said sickle bar including a longitudinal drive shaft having a crank disk overlying the head of said sickle bar and a pair of pitman rods connected to each other and to said disk and sickle bar, respectively, and means having a yielding break-joint connection with one of said rods and acting to restrain vertical movement of the connection between them.

12. A mowing machine comprising a wheel-supported main frame, an auxiliary sickle bar frame mounted upon said main frame for vertical swinging movement about a transverse axis, and an engine supported on said main frame and provided with drive connections to said sickle bar including a longitudinal drive shaft having a crank disk overlying the head of said sickle bar and a pair of pitman rods connected to each other and to said disk and sickle bar, respectively, a movable member having a yielding break-joint connection with one of said rods and acting to restrain vertical movement of the connection between them, and means for holding said member out of the path of movement of said rods upon disengagement of said break-joint connection.

13. A mowing machine comprising a wheel-supported main frame, an auxiliary sickle bar frame mounted upon said main frame for vertical swinging movement about a transverse axis, and an engine supported on said main frame and provided with drive connections to said sickle bar including a longitudinal drive shaft declining forwardly and having a crank disk overlying the head of said sickle bar and a pair of oppositely inclined pitman rods having ball and socket connections to each other and to the crank pin of said disk and sickle bar, respectively, and means for restraining vertical movement of the connection between said rods, the angle of decline of said shaft being such as to bring the center of motion of said crank pin connection in approximately the vertical plane of the lower pitman rod when said sickle bar is in lowered or working position.

14. In a mowing machine, a sickle bar and means for driving the same, said driving means comprising a rotary member and a pair of pitman members connecting said rotary member and sickle bar, and an oscillating element operatively connected to said pitman members for causing said pitman members to reciprocate said sickle bar.

15. A mowing machine comprising a main frame provided with supporting wheels, and with a pair of approximately vertical guideways, a pair of slide blocks removably and slidably mounted in said guideways, an auxiliary frame pivotally connected to said slide blocks, a sickle bar mounted on said auxiliary frame, and means for simultaneously raising and lowering said slide blocks within said guideways.

WILLIAM H. McCLURE.